United States Patent
Kim et al.

(10) Patent No.: US 10,796,663 B2
(45) Date of Patent: Oct. 6, 2020

(54) COLOR COMPENSATION DEVICE, ELECTRONIC DEVICE INCLUDING SAME, AND COLOR COMPENSATION METHOD OF ELECTRONIC DEVICE

(71) Applicant: Samsung Display Co., Ltd., Yongin-si, Gyeonggi-Do (KR)

(72) Inventors: Jongman Kim, Seoul (KR); Dong-hyun Yeo, Yongin-si (KR); Woojung Jung, Hwaseong-si (KR); Yong-bum Kim, Suwon-si (KR); Chul Kim, Hwaseong-si (KR); ByungKil Jeon, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/527,469

(22) Filed: Jul. 31, 2019

(65) Prior Publication Data

US 2020/0043441 A1 Feb. 6, 2020

(30) Foreign Application Priority Data

Jul. 31, 2018 (KR) .................. 10-2018-0089063

(51) Int. Cl.
*G09G 5/10* (2006.01)
*G09G 5/06* (2006.01)
(Continued)

(52) U.S. Cl.
CPC .............. *G09G 5/06* (2013.01); *G06T 7/90* (2017.01); *G06T 11/001* (2013.01);
(Continued)

(58) Field of Classification Search
CPC ...... G09G 3/3607; G09G 3/3611; G09G 5/06; G09G 2320/0242; G09G 2320/0666;
(Continued)

(56) References Cited

U.S. PATENT DOCUMENTS 6,435,654 B1 * 8/2002 Wang .................. G06K 15/02
347/19
6,552,495 B1 * 4/2003 Chang ................ F21V 23/0457
315/169.3
(Continued)

FOREIGN PATENT DOCUMENTS

JP        2015133606 A     7/2015
KR    1020070012017 A     1/2007
(Continued)

*Primary Examiner* — Joe H Cheng
(74) *Attorney, Agent, or Firm* — Cantor Colburn LLP

(57) ABSTRACT

Provided is a color compensation device of an electronic device including a first color converter, a parameter generator, an operator, and a second color converter. The first color converter receives an image signal, converts the image signal into initial tristimulus values based on a basic look-up table, and generates a conversion look-up table using the basic look-up table. The parameter generator extracts 2N number of representative parameters from the conversion look-up table and generates N number of compensation parameters on the basis of the 2N number of representative parameters. N is a natural number. The operator generates compensated tristimulus values at each gray scale using the N number of compensation parameters, generates a compensation look-up table, and converts the initial tristimulus values into the compensated tristimulus values using the compensation look-up table. The second color converter converts the compensated tristimulus values into a compensated image signal.

20 Claims, 12 Drawing Sheets

(51) Int. Cl.
*G06T 7/90* (2017.01)
*G06T 11/00* (2006.01)
*G09G 3/36* (2006.01)

(52) U.S. Cl.
CPC ... *G09G 3/3607* (2013.01); *G09G 2320/0242* (2013.01); *G09G 2320/0666* (2013.01); *G09G 2320/0673* (2013.01)

(58) Field of Classification Search
CPC ........ G09G 2320/0673; G09G 2340/06; G06T 7/90; G06T 11/00; G06T 11/001
See application file for complete search history.

(56) References Cited

U.S. PATENT DOCUMENTS

| | | | |
|---|---|---|---|
| 7,701,465 B2 * | 4/2010 | Suzuki | H04N 1/6058 345/600 |
| 8,237,749 B2 | 8/2012 | Kim et al. | |
| 2012/0236016 A1 * | 9/2012 | Fujino | G09G 3/3241 345/589 |
| 2012/0321177 A1 * | 12/2012 | Suzuki | H04N 1/6061 382/162 |
| 2013/0141740 A1 * | 6/2013 | Shimbaru | G06K 15/1878 358/1.9 |
| 2014/0049571 A1 * | 2/2014 | Erinjippurath | G02F 1/13471 345/690 |

FOREIGN PATENT DOCUMENTS

| | | |
|---|---|---|
| KR | 100723050 B1 | 5/2007 |
| KR | 1020070071137 A | 7/2007 |
| KR | 101046678 B1 | 7/2011 |
| KR | 101367199 B1 | 2/2014 |

* cited by examiner

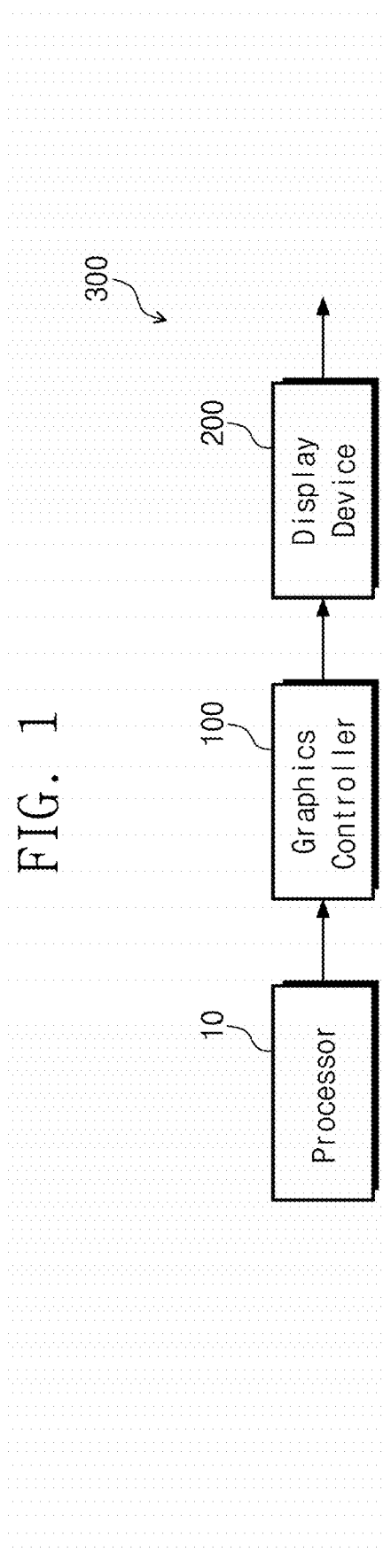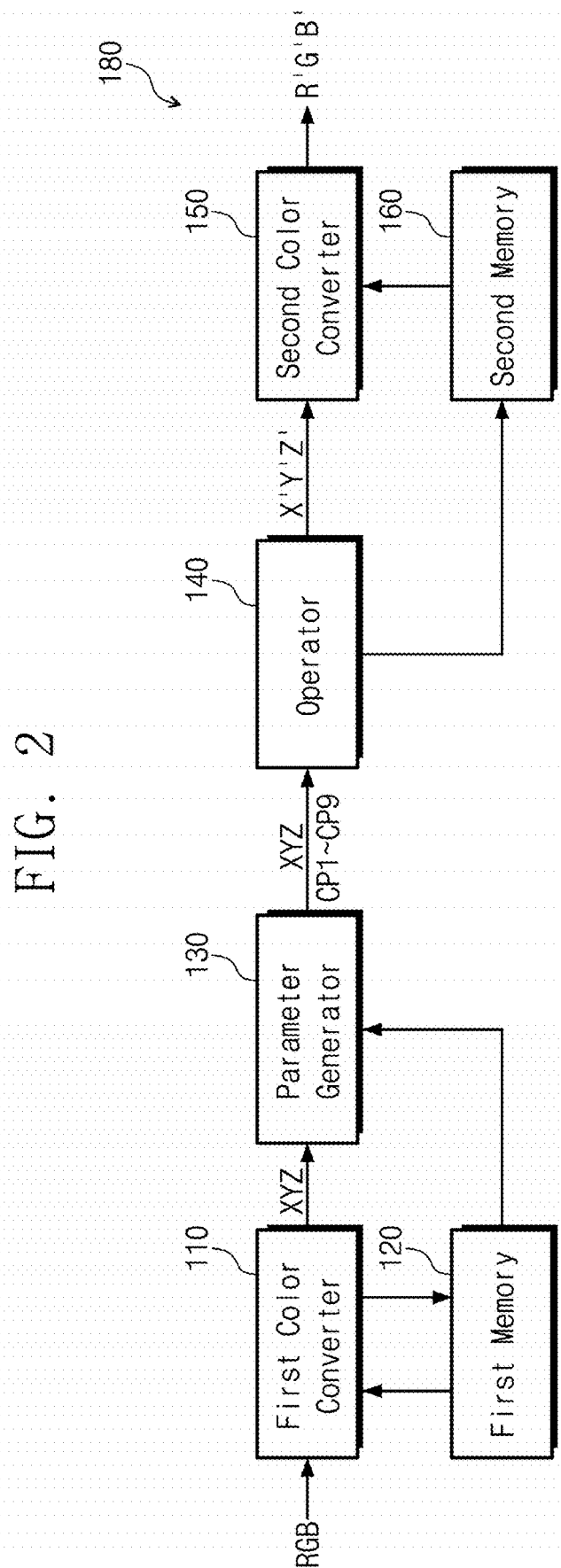

FIG. 3

| R | Y | x | y | | G | Y | x | y | | B | Y | x | y | | W | Y | x | y |
|---|---|---|---|---|---|---|---|---|---|---|---|---|---|---|---|---|---|---|
| R0 | Y0 | x0 | y0 | | G0 | Y0 | x0 | y0 | | B0 | Y0 | x0 | y0 | | W0 | Y0 | x0 | y0 |
| R1 | Y1 | x1 | y1 | | G1 | Y1 | x1 | y1 | | B1 | Y1 | x1 | y1 | | W1 | Y1 | x1 | y1 |
| ... | ... | ... | ... | | ... | ... | ... | ... | | ... | ... | ... | ... | | ... | ... | ... | ... |
| R254 | Y254 | x254 | y254 | | G254 | Y254 | x254 | y254 | | B254 | Y254 | x254 | y254 | | W254 | Y254 | x254 | y254 |
| R255 | Y255 | x255 | y255 | | G255 | Y255 | x255 | y255 | | B255 | Y255 | x255 | y255 | | W255 | Y255 | x255 | y255 |
| R-LUT1 | | | | | G-LUT1 | | | | | B-LUT1 | | | | | W-LUT1 | | | |

COLOR COMPENSATION DEVICE, ELECTRONIC DEVICE INCLUDING SAME, AND COLOR COMPENSATION METHOD OF ELECTRONIC DEVICE

CROSS-REFERENCE TO RELATED APPLICATIONS

This application claims priority to Korean Patent Application No. 10-2018-0089063, filed on Jul. 31, 2018, and all the benefits accruing therefrom under 35 U.S.C. § 119, the content of which in its entirety is herein incorporated by reference.

BACKGROUND

The present disclosure herein relates to a color compensation device, an electronic device including the same, and a color compensation method thereof, and more particularly, to a color compensation device capable of improving accuracy of color compensation, an electronic device including the same, and a color compensation method thereof.

There has been an increasing number of electronic devices provided with a display panel for displaying images. Not only electronic devices such as smart phones, notebooks, and televisions of which the function of displaying images is essential thereto, but also products employing a display panel, such as refrigerators, washing machines, printers, and the like are increasing. Accordingly, there is a further growing demand for the improvement of display quality of a liquid crystal display device.

In general, a liquid crystal display device uses a color compensation method by using a look-up table in which gamma characteristics are adjusted for each single color of RGB.

SUMMARY

In the case of a liquid crystal display device, a light leakage phenomenon in which light from a backlight is not completely blocked and is transmitted at a black gray scale, occurs. Due to such light leakage phenomenon, a color correction error may occur at a low gray scale. The present disclosure provides a color compensation device capable of achieving accurate color compensation.

The present disclosure also provides an electronic device including a color compensation device capable of improving accuracy of color compensation.

The present disclosure also provides a color compensation method of an electronic device, the method capable of improving accuracy of color compensation.

An exemplary embodiment of the inventive concept provides a color compensation device including a first color converter which receives an image signal, converts the image signal into initial tristimulus values based on a basic look-up table, and generates a conversion look-up table using the basic look-up table, a parameter generator which extracts 2N number of representative parameters from the conversion look-up table and generates N number of compensation parameters on the basis of the 2N number of representative parameters, an operator which generates compensated tristimulus values at each gray scale based on the N number of compensation parameters, generates a compensation look-up table, and converts the initial tristimulus values into the compensated tristimulus values using the compensation look-up table, and a second color converter which converts the compensated tristimulus values into a compensated image signal. Here, N is a natural number.

In an exemplary embodiment, the 2N number of representative parameters may include N number of first tristimulus values having a first representative gray scale and N number of second tristimulus values having a second representative gray scale.

In an exemplary embodiment, the first representative gray scale may be a black gray scale and the second representative gray scale may be a white gray scale.

In an exemplary embodiment, the N number of first tristimulus values may include a first red X stimulus value, a first red Y stimulus value, and a first red Z stimulus value with respect to a red component at the first representative gray scale, a first green X stimulus value, a first green Y stimulus value, and a first green Z stimulus value with respect to a green component at the first representative gray scale, and a first blue X stimulus value, a first blue Y stimulus value, and a first blue Z stimulus value with respect to a blue component at the first representative gray scale.

In an exemplary embodiment, the N number of second tristimulus values may include a second red X stimulus value, a second red Y stimulus value, and a second red Z stimulus value with respect to the red component at the second representative gray scale, a second green X stimulus value, a second green Y stimulus value, and a second green Z stimulus value with respect to the green component at the second representative gray scale, and a second blue X stimulus value, a second blue Y stimulus value, and a second blue Z stimulus value with respect to the blue component at the second representative gray scale.

In an exemplary embodiment, the N number of compensation parameters may include first to third compensation parameters, with respect to the red component, which are generated by subtracting the first red X stimulus value, the first red Y stimulus value, and the first red Z stimulus value from the second red X stimulus value, the second red Y stimulus value, and the second red Z stimulus value, respectively, fourth to sixth compensation parameters, with respect to the green component, which are generated by subtracting the first green X stimulus value, the first green Y stimulus value, and the first green Z stimulus value from the second green X stimulus value, the second green Y stimulus value, and the second green Z stimulus value, respectively, and seventh to ninth compensation parameters, with respect to the blue component, which are generated by subtracting the first blue X stimulus value, the first blue Y stimulus value, and the first blue Z stimulus value from the second blue X stimulus value, the second blue Y stimulus value, and the second blue Z stimulus value, respectively.

In an exemplary embodiment, compensated tristimulus values at each gray scale may include first to third compensated stimulus values with respect to the red component at the gray scale, fourth to sixth compensated stimulus values with respect to the green component at the gray scale, and seventh to ninth compensated stimulus values with respect to the blue component at the gray scale.

In an exemplary embodiment, the first to third compensated stimulus values may be values generated by multiplying first to third compensation values by first to third white stimulus values with respect to a white component at the gray scale, respectively, the fourth to sixth compensated stimulus values may be values generated by multiplying fourth to sixth compensation values by the first to third white stimulus values at the gray scale, respectively, and the seventh to ninth compensated stimulus values may be values generated by multiplying seventh to ninth compensation values by the first to third white stimulus values at the gray scale, respectively.

In an exemplary embodiment, the first compensation value may be a ratio of the first compensation parameter to the sum of the first, fourth and seventh compensation parameters, the second compensation value may be a ratio of the second compensation parameter to the sum of the second, fifth and eighth compensation parameters, and the third compensation value may be a ratio of the third compensation parameter to the sum of the third, sixth and ninth compensation parameters.

In an exemplary embodiment, the fourth compensation value may be a ratio of the fourth compensation parameter to the sum of the first, fourth and seventh compensation parameters, the fifth compensation value may be a ratio of the fifth compensation parameter to the sum of the second, fifth and eighth compensation parameters, and the sixth compensation value may be a ratio of the sixth compensation parameter to the sum of the third, sixth and ninth compensation parameters.

In an exemplary embodiment, the seventh compensation value may be a ratio of the seventh compensation parameter to the sum of the first, fourth and seventh compensation parameters, the eight compensation value may be a ratio of the eight compensation parameter to the sum of the second, fifth and eighth compensation parameters, and the ninth compensation value may be a ratio of the ninth compensation parameter to the sum of the third, sixth and ninth compensation parameters.

In an exemplary embodiment of the inventive concept, an electronic device includes a processor, a graphics controller, and a display device, where one of the graphics controller and the display device has a color compensation device.

In an exemplary embodiment, the color compensation device may include a first color converter which receives an image signal, converts the image signal into initial tristimulus values based on a basic look-up table, and generates a conversion look-up table using the basic look-up table, a parameter generator which extracts 2N number of representative parameters from the conversion look-up table and generates N number of compensation parameters on the basis of the 2N number of representative parameters, an operator which generates compensated tristimulus values at each gray scale based on the N number of compensation parameters, generates a compensation look-up table, and converts the initial tristimulus values into the compensated tristimulus values using the compensation look-up table, and a second color converter which converts the compensated tristimulus values into a compensated image signal. Here, N is a natural number.

In an exemplary embodiment, the color compensation device may be provided in the graphics controller.

In an exemplary embodiment, the display device may further include a signal controller which receives the compensated image signal and converts the compensated image signal into image data.

In an exemplary embodiment, the color compensation device may be provided in the display device.

In an exemplary embodiment of the inventive concept, a color compensation method of an electronic device includes receiving an image signal, converting the image signal into initial tristimulus values based on a basic look-up table, and generating a conversion look-up table using the basic look-up table, extracting 2N number of representative parameters from the conversion look-up table, generating N number of compensation parameters on the basis of the 2N number of representative parameters, generating compensated tristimulus values at each gray scale using the N number of compensation parameters, generating a compensation look-up table and converting the initial tristimulus values into the compensated tristimulus values using the compensation look-up table, and converting the compensated tristimulus values into a compensated image signal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 1 is a block diagram showing an exemplary embodiment of the configuration of an electronic device according to the inventive concept;

FIG. 2 is a block diagram of an exemplary embodiment of a color compensation device provided in the graphics controller shown in FIG. 1;

FIG. 3 is a diagram showing an example of first to fourth basic look-up tables previously stored in the first memory of FIG. 2;

DETAILED DESCRIPTION

Figure 4:
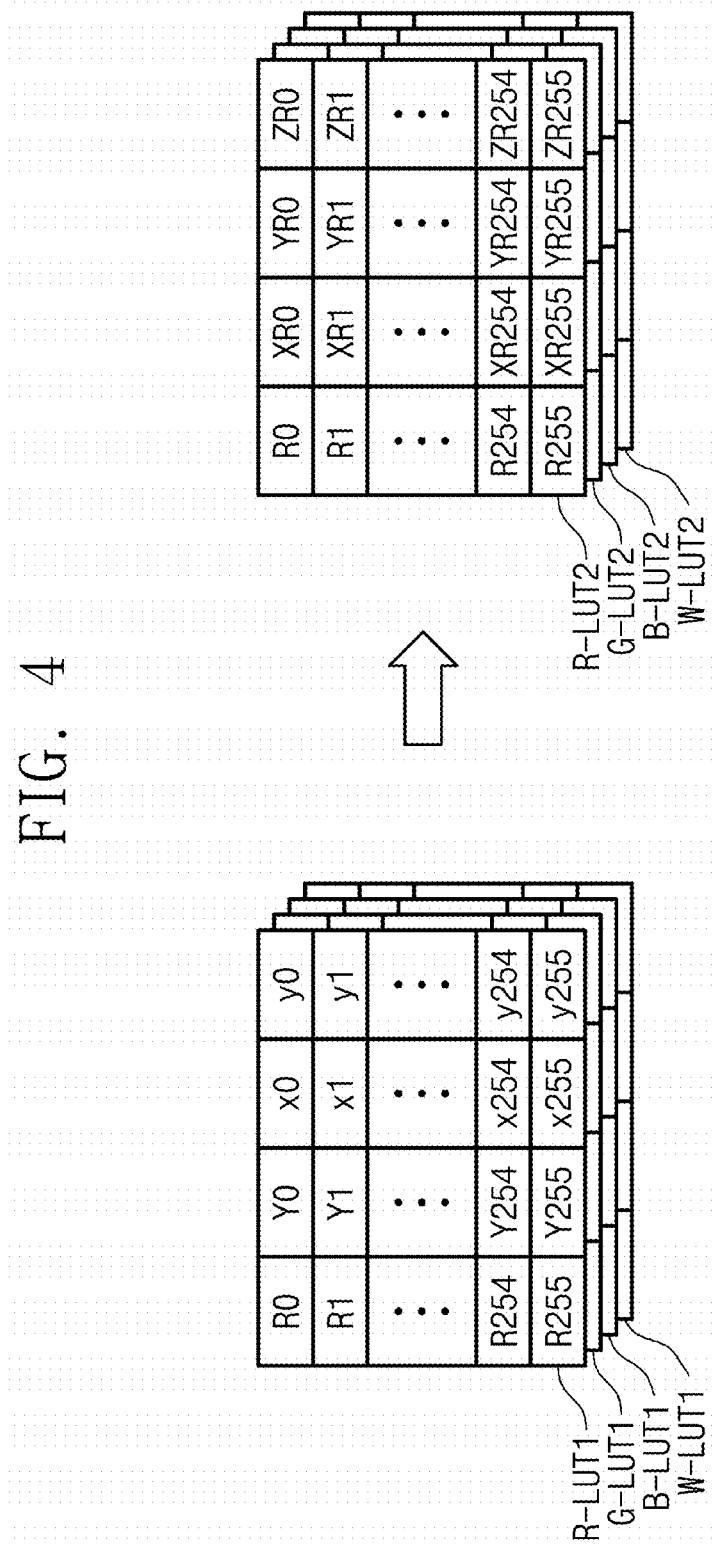
FIG. 4 is a diagram showing an example of first to fourth conversion look-up tables converted to tristimulus values.

In the present specification, it will be understood that when an element (or region, layer, portion, etc.) is referred to as being "on", "connected to", or "coupled to" another element, a third element may be interposed therebetween.

Like reference numerals refer to like elements. In addition, in the drawings, the thickness, proportion, and dimensions of the elements are exaggerated for an effective description of the technical content.

The terms "and/or" include all of one or more combinations which may be defined by associated configurations.

The terms "first", "second", and the like may be used to describe various elements, but the elements should not be limited by the terms. The terms are used only for the purpose of distinguishing one element from another. For example, a first element may be referred to as a second element, and similarly, a second component may also be referred to as a first component without departing from the scope of the inventive concept. Terms of a singular form may include terms of a plural form unless the context clearly indicates otherwise.

Also, the terms "below," "lower," "above," "upper," and the like are used to describe the relationship of configurations shown in the drawings. The terms are a relative concept and are described relative to the direction shown in the drawings.

It will be understood that the terms "comprise," "include" or "have" are intended to specify the presence of features, integers, steps, operations, elements, parts or combinations thereof, and do not exclude the possibility of the presence or addition of one or more other features, integers, steps, operations, elements, parts or combinations thereof.

Hereinafter, exemplary embodiments of the inventive concept will be described in detail with reference to the accompanying drawings.

FIG. 1 is a block diagram showing an exemplary embodiment of the configuration of an electronic device according to the inventive concept, and FIG. 2 is a block diagram of an exemplary embodiment of a color compensation device provided in the graphics controller shown in FIG. 1.

In an exemplary embodiment of the inventive concept, an electronic device 300 may be one of various electronic devices which include a display panel, such as TVs, monitors, smartphones, and tablet PCs. In FIG. 1, the electronic device 300 includes a processor 10, a graphics controller 100, and a display device 200.

The processor 10 may control the overall operation of the electronic device 300. As an example of the inventive concept, in an exemplary embodiment, the processor 10 may include a CPU. The graphics controller 100 may receive an image signal from the processor 10. The electronic device 300 processes the image signal through the graphics controller 100 and transmits the processed image signal to the display device 200. The display device 200 receives the processed image signal to output an image corresponding to the processed image signal.

In FIG. 1, a structure in which the processor 10 and the graphics controller 100 are separated is shown. However, in another exemplary embodiment, a plurality of processors (e.g., CPUs), the graphic controller 100, and an image processor ISP may be implemented as a single integrated processor.

The display device 200 may be a liquid crystal display device, but the invention is not particularly limited thereto. In another exemplary embodiment, the display device 200 may be an organic light emitting display device or a quantum dot light emitting display device. Hereinafter, the display device 200 is described as a liquid crystal display device.

Referring to FIG. 1 and FIG. 2, the graphics controller 100 may include a color compensation device 180 for performing color compensation of the image signal received from the processor 10 based on gamma characteristic. Although the graphics controller 100 may include various compensation blocks other than the color compensation device 180 for compensating the image signal, here, only the color compensation device 180 is shown for convenience of explanation.

Also, in the case in which the processor 10 (e.g., CPU) and the graphics controller 100 are integrated into one processor, the color compensation device 180 may be provided in the integrated processor.

The color compensation device 180 according to the inventive concept includes a first color converter 110, a parameter generator 130, an operator 140, and a second color converter 150. The first color converter 110 receives an image signal RGB and converts the image signal RGB into tristimulus values XYZ referring to first to fourth basic look-up tables R-LUT1, G-LUT1, B-LUT1, and W-LUT1.

FIG. 3 is a diagram showing an example of first to fourth basic look-up tables previously stored in the first memory of FIG. 2, and FIG. 4 is a diagram showing an example of first to fourth conversion look-up tables converted to tristimulus values.

Referring to FIGS. 2 to 4, the color compensation device 180 may further include a first memory 120 for storing the first to fourth basic look-up tables R-LUT1, G-LUT1, B-LUT1, and W-LUT1. The first memory 120 may be implemented in the form of a flash memory, hard disk, and the like. For example, the first memory 120 may be an electrically erasable and programmable ROM ("EE-PROM"). The first memory 120 may be provided in the graphics controller 100, but the invention is not limited thereto. That is, the first to fourth basic look-up tables R-LUT1, G-LUT1, B-LUT1, and W-LUT1 may be stored in a memory external to the graphics controller 100.

Each of the first to fourth basic look-up tables R-LUT1, G-LUT1, B-LUT1, and W-LUT1 may include a compensation value which is set according to a pre-measured gamma characteristic. As an example of the inventive concept, in an exemplary embodiment, the gamma characteristic of the display device 200 may include gamma characteristics with respect to red R, green G, blue B, and white W colors.

In this case, the first basic look-up table R-LUT1 may include the gamma characteristic with respect to a red color component, and the second basic look-up table G-LUT1 may include the gamma characteristic with respect to a green color component. In addition, the third basic look-up table B-LUT1 may include the gamma characteristic with respect to a blue color component, and the fourth basic look-up table W-LUT1 may include the gamma characteristic with respect to a white color component.

The gamma characteristic of each of the first to fourth basic look-up tables R-LUT1, G-LUT1, B-LUT1, and W-LUT1 may include a luminance component Y and color coordinate components x and y by color. Here, each of the basic look-up tables refers to a table mapping corresponding color at each gray scale to a corresponding luminance component and corresponding color coordinate components as shown in FIG. 3.

In a case that the image signal is composed of an 8-bit signal, for example, the size of each of the first to fourth basic look-up tables R-LUT1, G-LUT1, B-LUT1, and W-LUT1 may be 255×3 (three characteristics), and the whole size of the first to fourth basic look-up tables R-LUT1, G-LUT1, B-LUT1, and W-LUT1 may be 255×3× 4.

The first color converter 110 receives the image signal RGB and converts the image signal RGB into the tristimulus values XYZ referring to the first to fourth basic look-up tables R-LUT1, G-LUT1, B-LUT1, and W-LUT1. As an example of the inventive concept, in an exemplary embodiment, the first color converter 110 may convert the image signal RGB into the tristimulus values XYZ corresponding to the CIE 1931 color area, which is the standard color gamut.

The first color converter 110 may generate the tristimulus values XYZ using data of the first to fourth basic look-up tables R-LUT1, G-LUT1, B-LUT1, and W-LUT1 according to a calculation formula below.

In the tristimulus values XYZ, an X stimulus value is obtained by Equation 1 below, and an Z stimulus value is obtained by Equation 2 below.

$$X = \frac{x}{y} Y \quad \text{[Equation 1]}$$

$$Z = \frac{(1-x-y)}{y} Y \quad \text{[Equation 2]}$$

The first color converter 110 may calculate the tristimulus values XYZ for each gray scale per each color component through the above equations. For example, tristimulus values XR0, YR0, and ZR0 of a red component corresponding to a black gray scale R0 of the red component may be calculated by a luminance component Y0 and color coordinate components x0 and y0 of the red component corresponding to the black gray scale R0 of the red component. Tristimulus values XR255, YR255, and ZR255 of a red component corresponding to a white gray scale R255 of the red component may be calculated by a luminance component Y255 and color coordinate components x255 and y255 of the red component corresponding to the white gray scale R255 of the red component.

Through the calculation described above, a first conversion look-up table R-LUT2 corresponding to the red component may be generated. Through the same calculation process, second to fourth conversion look-up tables G-LUT2, B-LUT2, and W-LUT2 corresponding to the green component, the blue component, and the white component respectively are generated. Here, each of the conversion look-up tables refers to a table mapping corresponding color at each gray scale to corresponding tristimulus values as shown in FIG. 4.

The generated first to fourth conversion look-up tables R-LUT2, G-LUT2, B-LUT2, and W-LUT2 may be stored in the first memory 120, but the invention is not limited thereto. That is, the first to fourth conversion look-up tables R-LUT2, G-LUT2, B-LUT2, and W-LUT2 may be stored in a different memory other than the first memory 120. In an exemplary embodiment, the first color converter 110 may convert the image signal RGB into tristimulus values XYZ referring to the first to fourth conversion look-up tables R-LUT2, G-LUT2, B-LUT2, and W-LUT2 generated using the basic look-up tables R-LUT1, G-LUT1, B-LUT1, and W-LUT1.

Figure 5:
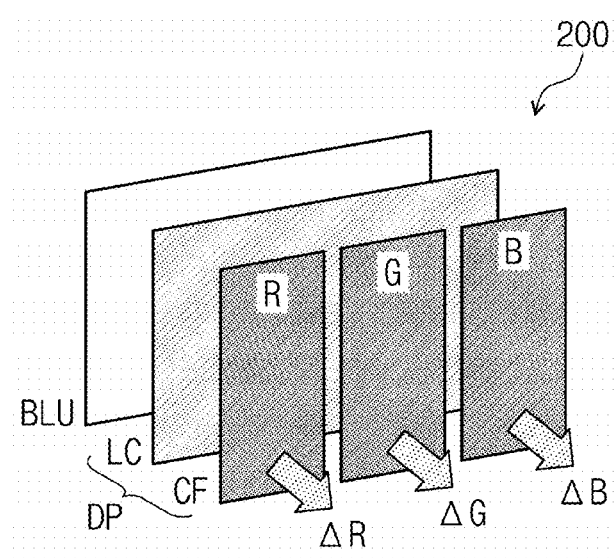
FIG. 5 is an exemplary diagram for explaining the configuration of the display device shown in FIG. 1 and a light leakage phenomenon.

FIG. 5 is an exemplary diagram for explaining the configuration of the display device shown in FIG. 1 and a light leakage phenomenon.

As shown in FIG. 5, the display device 200 may include a display panel DP and a backlight assembly BLU. The display panel DP includes two substrates (not shown) and a liquid crystal layer LC interposed between the two substrates. On any one of the two substrates, a color filer layer CF may be provided. The color filer layer CF may include red, green and blue color filters R, G, and B.

The backlight assembly BLU generates light. The light generated from the backlight assembly BLU may be white light and have a uniform gray scale that is the same with or higher than the maximum gray scale the display device 200 may provide to the outside. The light generated by the backlight assembly BLU may be converted into light of which gray scale is adjusted after passing through the liquid crystal layer LC. Thereafter, the gray scale-adjusted light may be converted into color-filtered light while passing through the color filter layer CF, and thus, the display device 200 may finally display an image through the light having gray scale information and color information.

The display panel DP includes a plurality of pixels (not shown) and each of the pixels may include three sub-pixels (not shown) disposed corresponding to the red, green and blue color filters R, G, and B, respectively. When one pixel expresses a black gray scale, it means that each of the three sub-pixels expresses the black gray scale thereof, in which case light that has passed through each of the red, green and blue color filters R, G, and B should have a gray scale value of 0 (that is, the black gray scale thereof). That is, when the black gray scale is expressed, the light from the backlight assembly BLU should not be outputted from in the red, green and blue color filters R, G, and B in an ideal situation.

However, a light leakage phenomenon substantially occurs in each sub-pixel, and a light leakage component at the black gray scale is present in each color filter R, G, and B. Here, the light leakage components of color filters R, G, and B are referred as ΔR, ΔG, and ΔB, respectively.

Hereinafter, a method for achieving accurate color compensation by removing the light leakage components ΔR, ΔG, and ΔB for the colors through a calculation process according to the inventive concept will be described.

Figure 6:
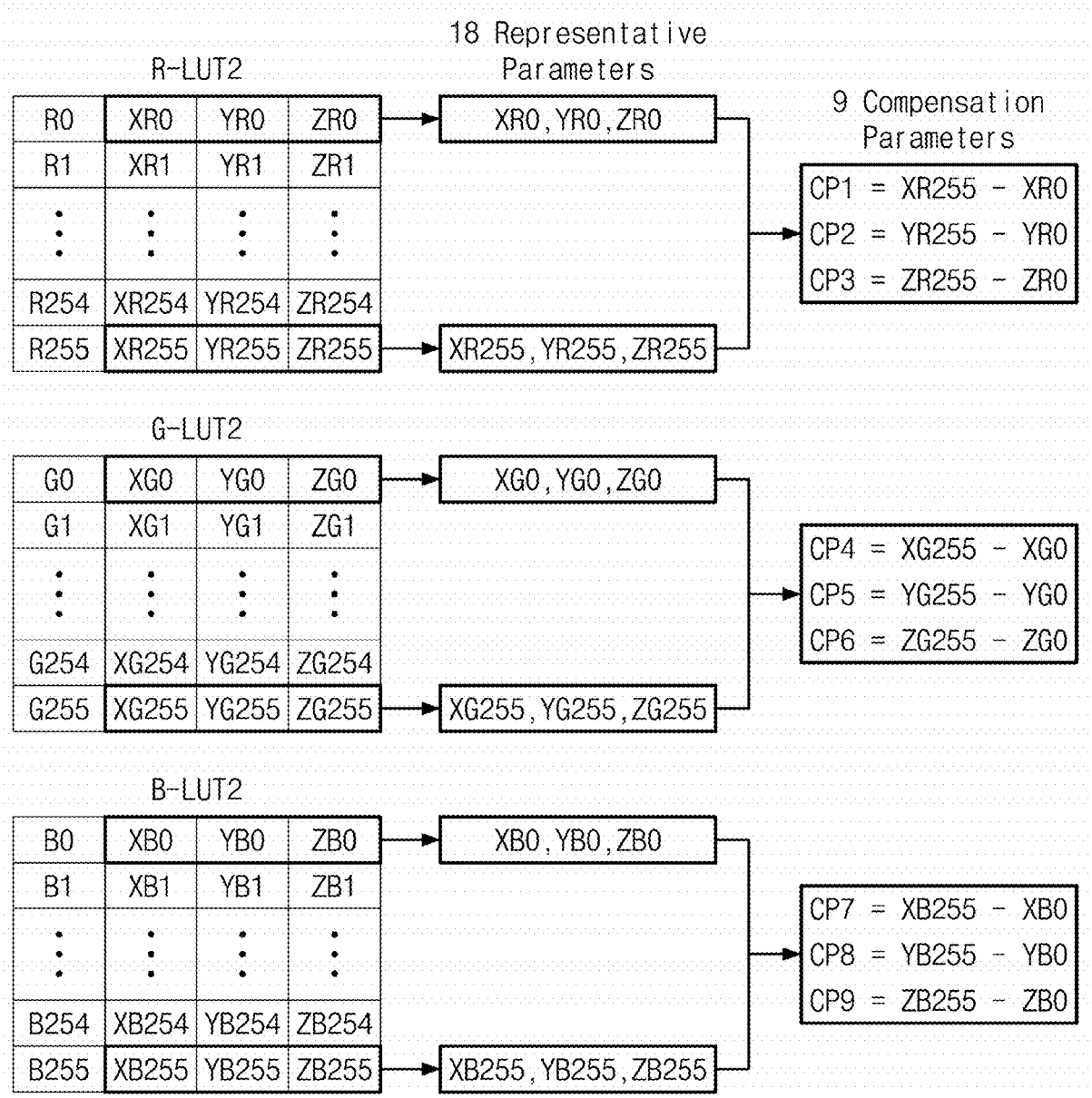
FIG. 6 is a diagram for explaining the operation of the parameter generator shown in FIG. 2.

FIG. 6 is a diagram for explaining the operation of the parameter generator shown in FIG. 2.

Referring to FIG. 2 and FIG. 6, the parameter generator 130 receives the tristimulus values XYZ with respect to each color from the first to fourth conversion look-up tables R-LUT2, G-LUT2, B-LUT2, and W-LUT2 stored in the first memory 120. The parameter generator 130 extracts 2N number of representative parameters from the received tristimulus values XYZ. Here, N is a natural number. Furthermore, the parameter generator 130 generates N number of compensation parameters on the basis of the 2N number of representative parameters. Here, the N may be 9, for example. When the N is 9, the parameter generator 130 may extract 18 representative parameters, and generates 9 compensation parameters CP1 to CP9 based on the 18 representative parameters.

The 2N number of representative parameters may include N number of first tristimulus values having a first representative gray scale of each color and N number of second tristimulus values having a second representative gray scale of each color. Here, the first representative gray scale may be a black gray scale (e.g., 0 gray scale), and the second representative gray scale may be a white gray scale (e.g., 255 gray scale), but the invention is not limited thereto.

The N number of first tristimulus values may include a first red X stimulus value XR0, a first red Y stimulus value YR0, and a first red Z stimulus value ZR0 with respect to the red component as the first representative gray scale, a first green X stimulus value XG0, a first green Y stimulus value YG0, and a first green Z stimulus value ZG0 with respect to the green component as the first representative gray scale, and a first blue X stimulus value XB0, a first blue Y stimulus value YB0, and a first blue Z stimulus value ZB0 with respect to the blue component as the first representative gray scale.

The N number of second tristimulus values may include a second red X stimulus value XR255, a second red Y stimulus value YR255, and a second red Z stimulus value ZR255 as the second representative gray scale with respect to the red component, a second green X stimulus value XG255, a second green Y stimulus value YG255, and a second green Z stimulus value ZG255 as the second representative gray scale with respect to the green component, and a second blue X stimulus value XB255, a second blue Y stimulus value YB255, and a second blue Z stimulus value ZB255 as the second representative gray scale with respect to the blue component.

As shown in FIG. 6, the parameter generator 130 extracts, from the first conversion look-up table R-LUT2, the first red X stimulus value XR0, the first red Y stimulus value YR0, and the first red Z stimulus value ZR0 with respect to the red component of the black gray scale, and the second red X stimulus value XR255, the second red Y stimulus value YR255, and the second red Z stimulus value ZR255 with respect to the red component of the white gray scale. That is, the parameter generator 130 may extract a total of 6 representative parameters XR0, YR0, ZR0, XR255, YR255, and ZR255 from the first conversion look-up table R-LUT2.

In addition, the parameter generator 130 extracts, from the second conversion look-up table G-LUT2, the first green X stimulus value XG0, the first green Y stimulus value YG0, and the first green Z stimulus value ZG0 with respect to the green component of the black gray scale, and the second green X stimulus value XG255, the second green Y stimulus value YG255, and the second green Z stimulus value ZG255 with respect to the green component of the white gray scale. That is, the parameter generator 130 extracts a total of 6 representative parameters XG0, YG0, ZG0, XG255, YG255, and ZG255 from the first conversion look-up table G-LUT2.

The parameter generator 130 extracts, from the third conversion look-up table B-LUT2, the first blue X stimulus value XB0, the first blue Y stimulus value YB0, and the first blue Z stimulus value ZB0 with respect to the blue component of the black gray scale, and the second blue X stimulus value XB255, the second blue Y stimulus value YB255, and the second blue Z stimulus value ZB255 with respect to the blue component of the white gray scale. That is, the parameter generator 130 extracts a total of 6 representative parameters XG0, YG0, ZG0, XG255, YG255, and ZG255 from the first conversion look-up table B-LUT2.

As such, the parameter generator 130 extracts a total of 18 representative parameters from the first to third conversion look-up tables R-LUT2, G-LUT2, and B-LUT2. Thereafter, the parameter generator 130 generates the 9 compensation parameters CP1 to CP9 using the 18 extracted representative parameters.

As an example of the inventive concept, in an exemplary embodiment, the 9 compensation parameters CP1 to CP9 includes the first to third compensation parameters CP1 to CP3 with respect to the red component, the fourth to sixth compensation parameters CP4 to CP6 with respect to the green component, and the seventh to ninth compensation parameters CP7 to CP9 with respect to the blue component. The first to third compensation parameters CP1 to CP3 are generated by subtracting the first red X stimulus value XR0, the first red Y stimulus value YR0, and the first red Z stimulus value ZR0 from the second red X stimulus value XR255, the second red Y stimulus value YR255, and the second red Z stimulus value ZR255, respectively.

The fourth to sixth compensation parameters CP4 to CP6 are generated by subtracting the first green X stimulus value XG0, the first green Y stimulus value YG0, and the first green Z stimulus value ZG0 from the second green X stimulus value XG255, the second green Y stimulus value YG255, and the second green Z stimulus value ZG255, respectively.

The seventh to ninth compensation parameters CP7 to CP9 are generated by subtracting the first blue X stimulus value XB0, the first blue Y stimulus value YB0, and the first blue Z stimulus value ZB0 from the second blue X stimulus value XB255, the second blue Y stimulus value YB255, and the second blue Z stimulus value ZB255, respectively.

Referring back to FIG. 2, the operator 140 generates compensated tristimulus values X'Y'Z' with respect to each gray scale of each color using the 9 compensation parameters CP1 to CP9. Here, the compensated tristimulus values X'Y'Z' are values obtained by compensating the tristimulus value XYZ in consideration of the light leakage components ΔR, ΔG, and ΔB for each color.

Figure 7:
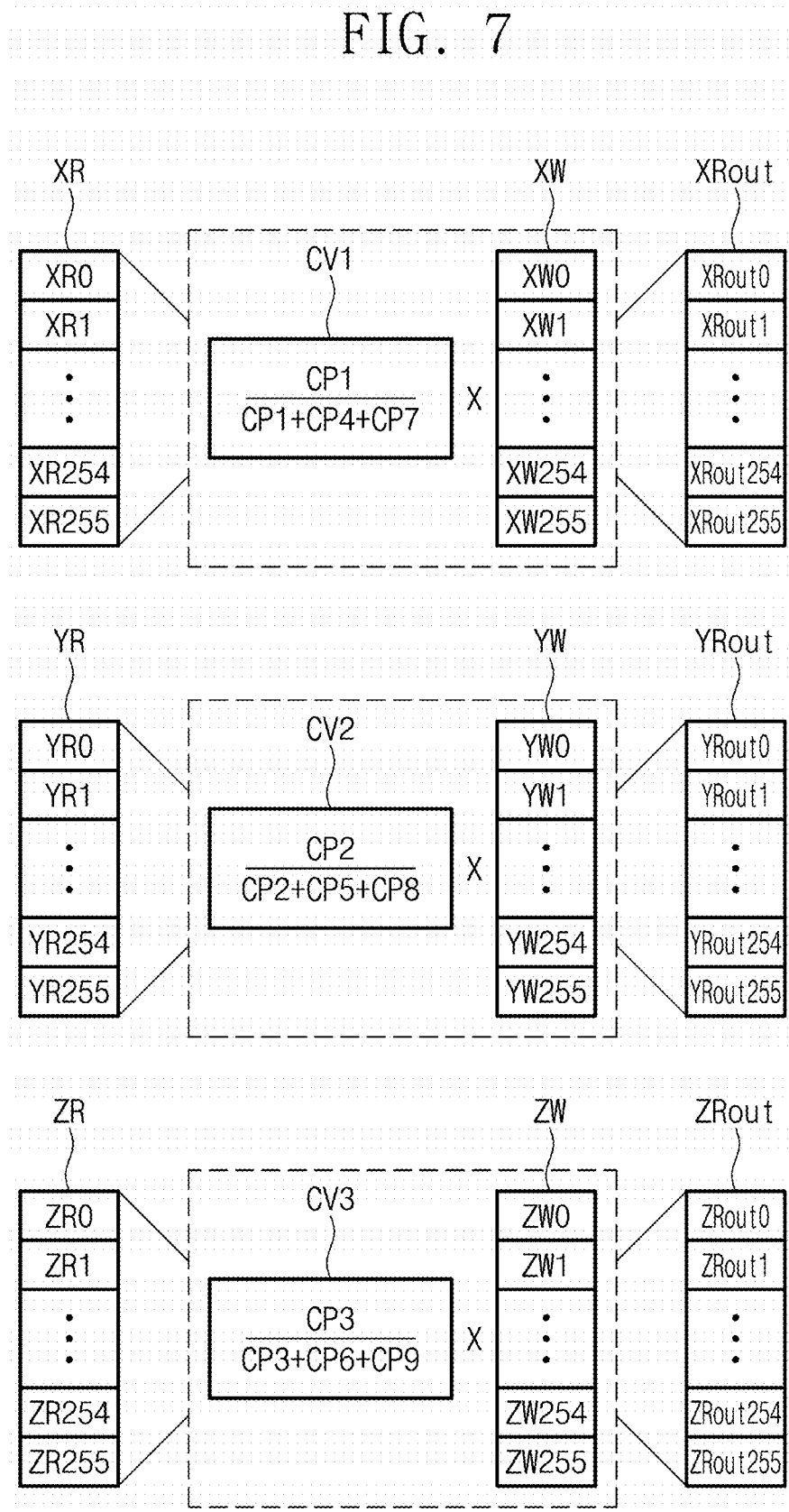
FIGS. 7 to 9 are diagrams for explaining the operation of the operator shown in FIG. 2.
Figure 8:
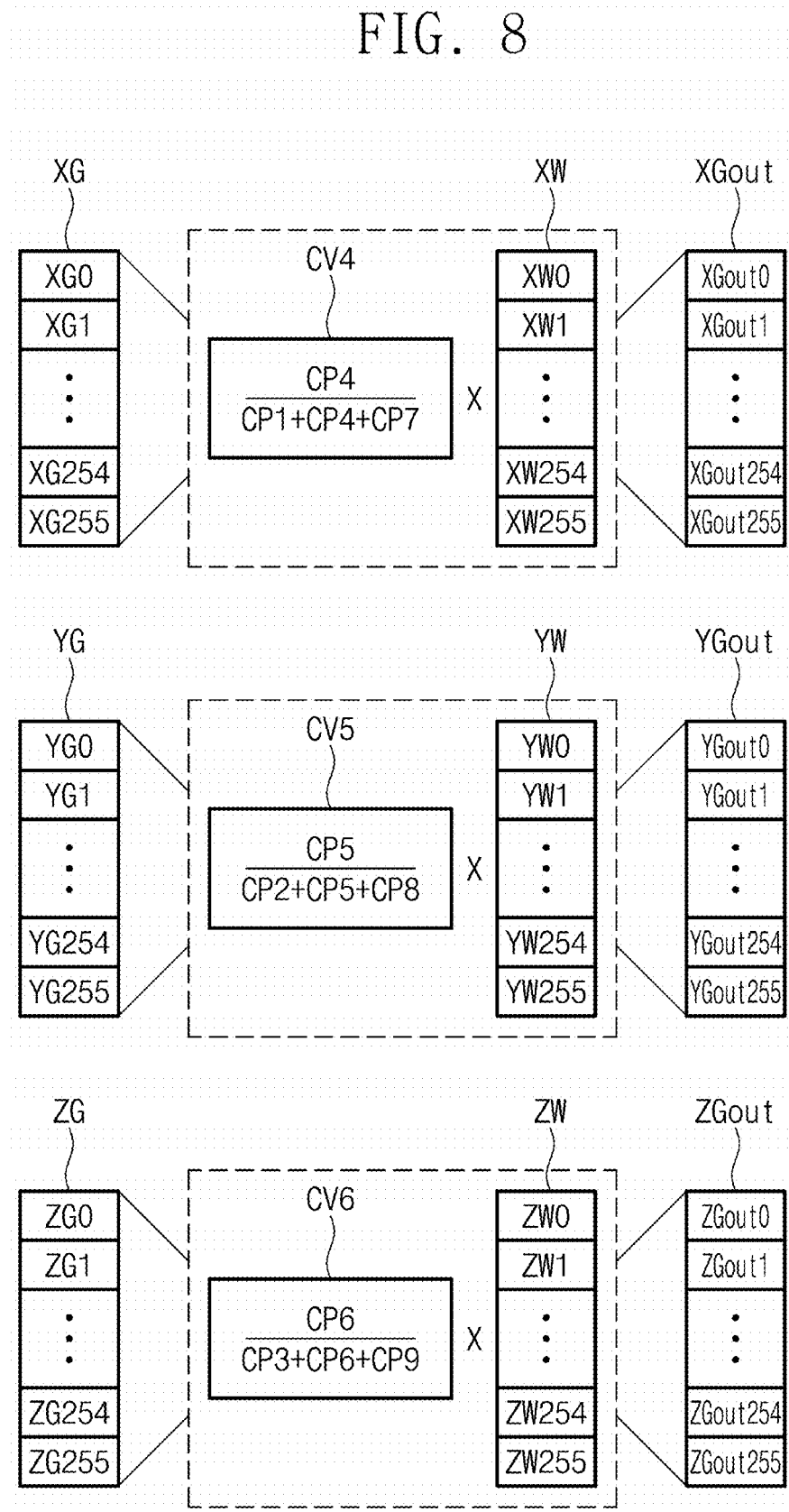
Figure 9:
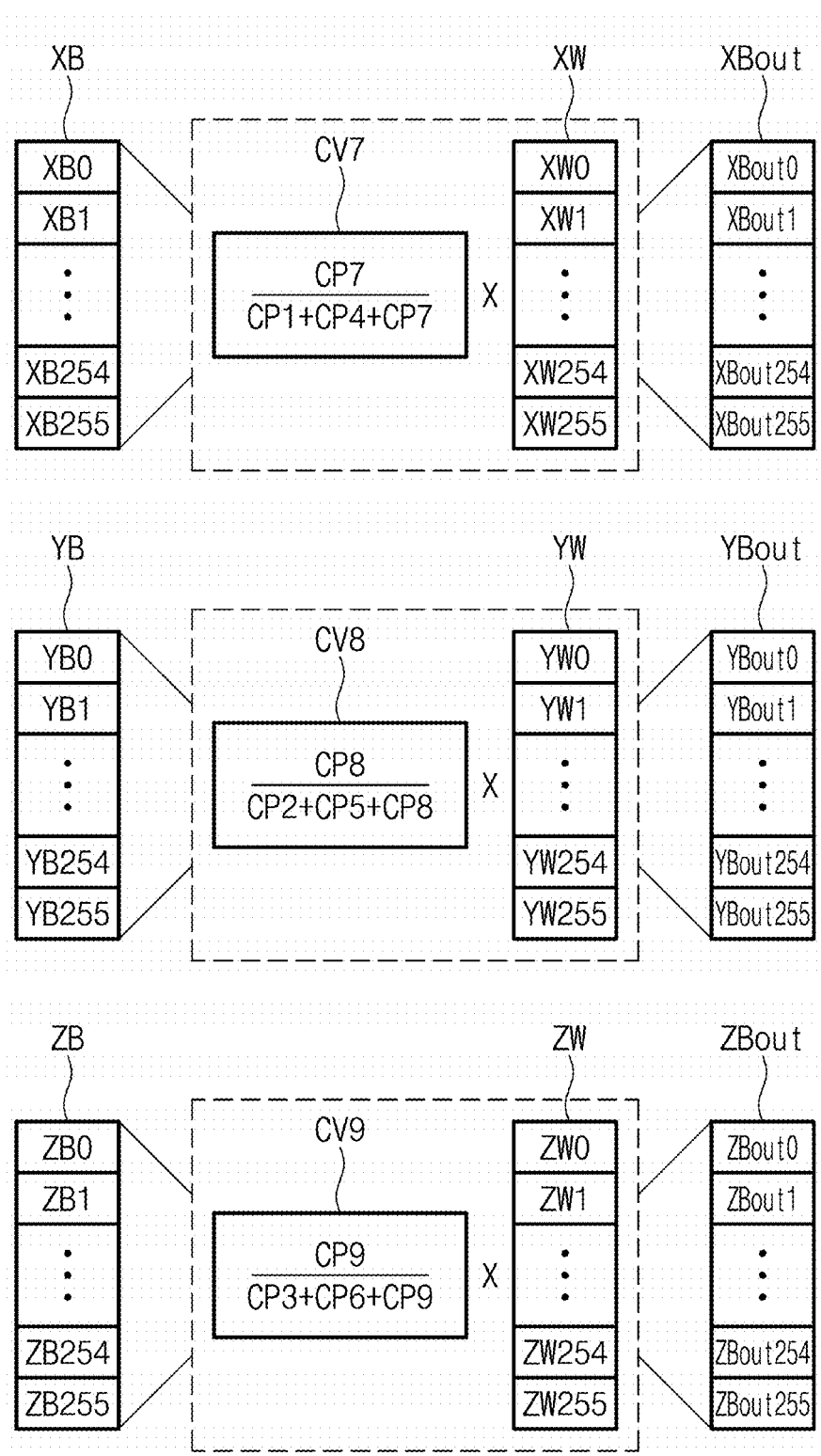

FIGS. 7 to 9 are diagrams for explaining the operation of the operator shown in FIG. 2.

Referring to FIG. 2 and FIG. 7, the compensated tristimulus values X'Y'Z' include first to third compensated stimulus values XRout, YRout, and ZRout with respect to the red component, fourth to sixth compensated stimulus values XGout, YGout, and ZGout with respect to the green component, and seventh to ninth compensated stimulus values XBout, YBout, and ZBout with respect to the blue component.

The first compensated stimulus value XRout may include a total of 256 first compensated stimulus values XRout1 to XRout255 from the black gray scale to the white gray scale. The second compensated stimulus value YRout may include a total of 256 second compensated stimulus values YRout1 to YRout255 from the black gray scale to the white gray scale. The third compensated stimulus value ZRout may include a total of 256 second compensated stimulus values ZRout1 to ZRout255 from the black gray scale to the white gray scale.

Here, the first to third compensated stimulus values XRout, YRout, and ZRout are values generated by multiplying first to third compensation values CV1, CV2, and CV3 by first to third white stimulus values XW, YW, and ZW with respect to the white component, respectively. For example, a first compensated stimulus value XRout0 with respect to a red component at a first gray scale (i.e., black gray scale) is generated by multiplying a first compensation value CV1 by a first white stimulus value XW0 with respect to a white component at the first gray scale. That is, the first to third compensated stimulus values XRout, YRout, and ZRout at a specific gray scale are values generated by multiplying the first to third compensation values CV1, CV2, and CV3 by the first to third white stimulus values XW, YW, and ZW with respect to a white component at the specific gray scale, respectively.

Here, the first to third compensation values CV1, CV2, and CV3 satisfy Equations 3 to 5 below, respectively.

$$CV1 = \frac{CP1}{CP1 + CP4 + CP7} \qquad \text{[Equation 3]}$$

$$CV2 = \frac{CP2}{CP2 + CP5 + CP8} \qquad \text{[Equation 4]}$$

$$CV3 = \frac{CP3}{CP3 + CP6 + CP9} \qquad \text{[Equation 5]}$$

The first compensation value CV1 is a ratio of the first compensation parameter CP1 to the sum of the first, fourth and seventh compensation parameters CP1, CP4, and CP7. The second compensation value CV2 is a ratio of the second compensation parameter CP2 to the sum of the second, fifth and eighth compensation parameters CP2, CP5, and CP8. The third compensation value CV3 is a ratio of the third compensation parameter CP3 to the sum of the third, sixth and ninth compensation parameters CP3, CP6, and CP9.

In addition, the first to third compensated stimulus values XRout, YRout, and ZRout satisfy Equations 6 to 8 below, respectively.

$$XRout = CV1 \times XW \quad \text{[Equation 6]}$$

$$YRout = CV2 \times YW \quad \text{[Equation 7]}$$

$$ZRout = CV3 \times ZW \quad \text{[Equation 8]}$$

Through the calculation process described above, first to third stimulus values XR, YR, and ZR are converted into the first to third compensated stimulus values XRout, YRout, and ZRout respectively, which correspond to the compensated stimulus values that the light leakage components ΔR, ΔG, and ΔB are removed from the first to third stimulus values XR, YR, and ZR.

Referring to FIG. 2 and FIG. 8, the fourth compensated stimulus value XGout may include a total of 256 fourth compensated stimulus values XGout1 to XGout255 from the black gray scale to the white gray scale. The fifth compensated stimulus value YGout may include a total of 256 fifth compensated stimulus values YGout1 to YGout255 from the black gray scale to the white gray scale. The sixth compensated stimulus value ZGout may include a total of 256 sixth compensated stimulus values ZGout1 to ZGout255 from the black gray scale to the white gray scale.

Here, the fourth to sixth compensated stimulus values XGout, YGout, and ZGout are values generated by multiplying fourth to sixth compensation values CV4, CV5, and CV6 by the first to third white stimulus values XW, YW, and ZW with respect to the white component, respectively. For example, a fourth compensated stimulus value XGout0 with respect to a green component at the first gray scale (i.e., black gray scale) is generated by multiplying the fourth compensation value CV4 by the first white stimulus value XW0 with respect to the white component at the first gray scale. That is, the fourth to sixth compensated stimulus values XGout, YGout, and ZGout a specific gray scale are values generated by multiplying the fourth to sixth compensation values CV4, CV5, and CV6 by the first to third white stimulus values XW, YW, and ZW with respect to the white component at the specific gray scale, respectively.

Here, the fourth to sixth compensation values CV4, CV5, and CV6 satisfy Equations 9 to 11 below, respectively.

$$CV4 = \frac{CP4}{CP1 + CP4 + CP7} \quad \text{[Equation 9]}$$

$$CV5 = \frac{CP5}{CP2 + CP5 + CP8} \quad \text{[Equation 10]}$$

$$CV6 = \frac{CP6}{CP3 + CP6 + CP9} \quad \text{[Equation 11]}$$

The fourth compensation value CV4 is a ratio of the fourth compensation parameter CP4 to the sum of the first, fourth and seventh compensation parameters CP1, CP4, and CP7. The fifth compensation value CV5 is a ratio of the fifth compensation parameter CP5 to the sum of the second, fifth and eighth compensation parameters CP2, CP5, and CP8. The sixth compensation value CV6 is a ratio of the sixth compensation parameter CP6 to the sum of the third, sixth and ninth compensation parameters CP3, CP6, and CP9.

In addition, the fourth to sixth compensated stimulus values XGout, YGout, and ZGout satisfy Equations 12 to 14 below, respectively.

$$XGout = CV4 \times XW \quad \text{[Equation 12]}$$

$$YGout = CV5 \times YW \quad \text{[Equation 13]}$$

$$ZGout = CV6 \times ZW \quad \text{[Equation 14]}$$

Through the calculation process described above, fourth to sixth stimulus values XG, YG, and ZG are converted into the fourth to sixth compensated stimulus values XGout, YGout, and ZGout respectively, which correspond to the compensated stimulus values that the light leakage components ΔR, ΔG, and ΔB are removed from fourth to sixth stimulus values XG, YG, and ZG.

Referring to FIG. 2 and FIG. 9, a seventh compensated stimulus value XBout may include a total of 256 seventh compensated stimulus values XBout1 to XBout255 from the black gray scale to the white gray scale. An eighth compensated stimulus value YBout may include a total of 256 eighth compensated stimulus values YBout1 to YBout255 from the black gray scale to the white gray scale. A ninth compensated stimulus value ZBout may include a total of 256 ninth compensated stimulus values ZBout1 to ZBout255 from the black gray scale to the white gray scale.

Here, the seventh to ninth compensated stimulus values XBout, YBout, and ZBout are values generated by multiplying seventh to ninth compensation values CV7, CV8, and CV9 by the first to third white stimulus values XW, YW, and ZW with respect to the white component, respectively. For example, a seventh compensated stimulus value XBout0 with respect to a blue component at the first gray scale (i.e., black gray scale) is generated by multiplying the seventh compensation value CV7 by the first white stimulus value XW0 with respect to the white component at the first gray scale. That is, the seventh to ninth compensated stimulus values XBout, YBout, and ZBout at a specific gray scale are values generated by multiplying the seventh to ninth compensation values CV7, CV8, and CV9 by the first to third white stimulus values XW, YW, and ZW with respect to the white component at the specific gray scale, respectively.

Here, the seventh to ninth compensation values CV7, CV8, and CV9 satisfy Equations 15 to 17 below, respectively.

$$CV7 = \frac{CP7}{CP1 + CP4 + CP7} \quad \text{[Equation 15]}$$

$$CV8 = \frac{CP8}{CP2 + CP5 + CP8} \quad \text{[Equation 16]}$$

$$CV9 = \frac{CP9}{CP3 + CP6 + CP9} \quad \text{[Equation 17]}$$

The seventh compensation value CV7 is a ratio of the seventh compensation parameter CP7 to the sum of the first, fourth and seventh compensation parameters CP1, CP4, and CP7. The eighth compensation value CV8 is a ratio of the eighth compensation parameter CP8 to the sum of the second, fifth and eighth compensation parameters CP2, CP5, and CP8. The ninth compensation value CV9 is a ratio of the ninth compensation parameter CP9 to the sum of the third, sixth and ninth compensation parameters CP3, CP6, and CP9.

In addition, the seventh to ninth compensated stimulus values XBout, YBout, and ZBout satisfy Equations 18 to 20 below, respectively.

$$XBout = CV7 \times XW \quad \text{[Equation 18]}$$

$$YBout = CV8 \times YW \quad \text{[Equation 19]}$$

$$ZBout = CV9 \times ZW \quad \text{[Equation 20]}$$

Through the calculation process described above, seventh to ninth stimulus values XB, YB, and ZB are converted into the seventh to ninth compensated stimulus values XBout, YBout, and ZBout respectively, which correspond to the compensated stimulus values that the light leakage components ΔR, ΔG, and ΔB are removed from the seventh to ninth stimulus values XB, YB, and ZB.

Figure 10A:
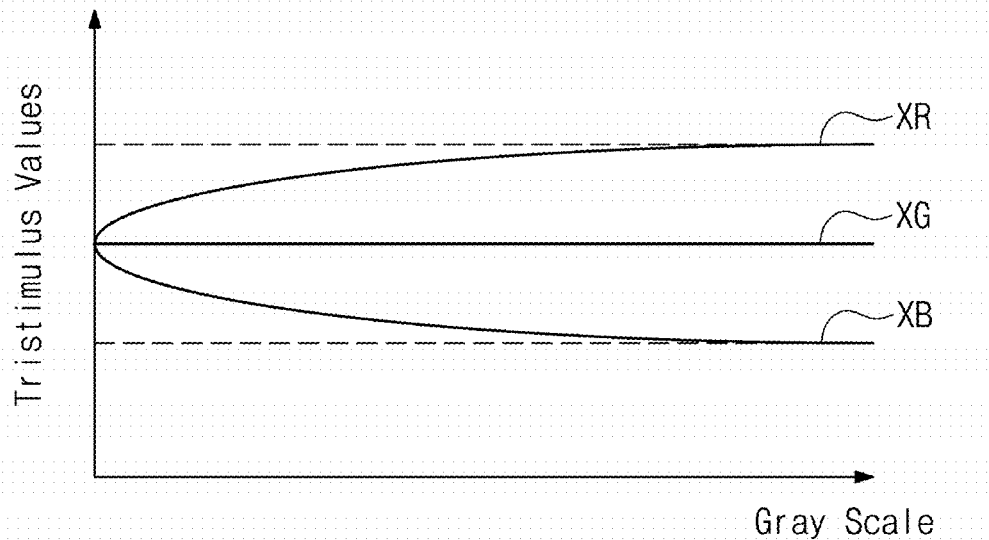
FIG. 10A is a graph showing red, green, and blue X stimulus values versus a gray scale before compensation.
Figure 10B:
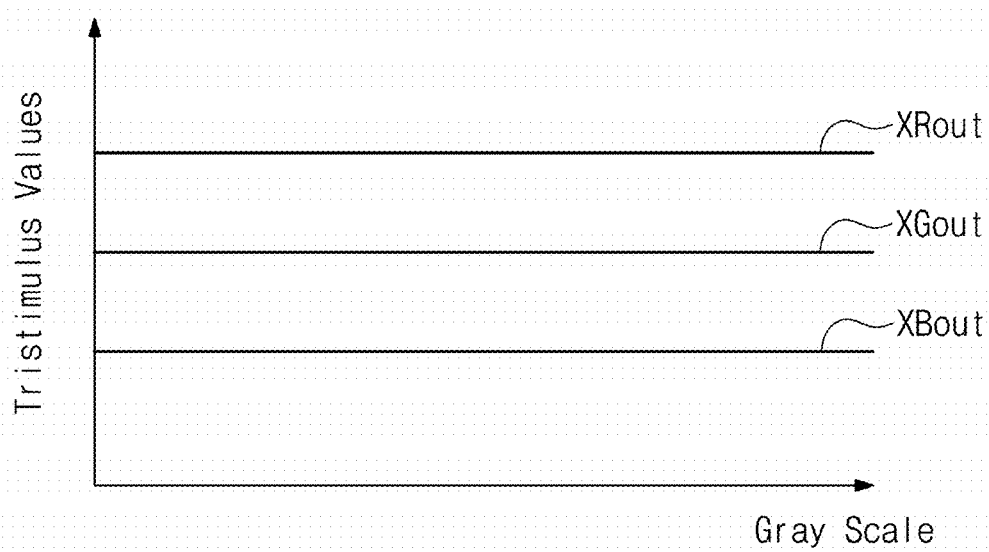
FIG. 10B is a graph showing red, green, and blue X stimulus values versus a gray scale after compensation.

FIG. 10A is a graph showing red, green, and blue X stimulus values versus a gray scale before compensation, and FIG. 10B is a graph showing red, green, and blue X stimulus values versus a gray scale after compensation.

Referring to FIG. 10A, before the compensation, a light leakage phenomenon in which red, green, and blue X stimulus values, that is, the first, fourth, and seventh stimulus values XR, XG, and XB, are distorted at low gray scales due to the light leakage. Specifically, the lower the gray scale is, the lower a first stimulus value XR is and the higher a seventh stimulus value XB is, such that the first stimulus value XR and the seventh stimulus value XB are distorted in a form which converges to a fourth stimulus value XG.

As shown in FIGS. 7 to 9, in the cases that the first, fourth, and seventh stimulus values XR, XG, and XB are compensated by the first, fourth and seventh compensation values CV1, CV4, and CV7, respectively, the first, fourth, and seventh compensated stimulus values XRout, XGout, and XBout are generated.

According to FIG. 10B, the first compensated stimulus value XRout is maintained without change at all gray scales, and the seventh compensated stimulus value XBout is also maintained at all gray scales. Therefore, through the compensation process described above, the first, fourth, and seventh compensated stimulus values XRout, XGout, and XBout in which a distortion phenomenon at the low gray scale is removed may be generated.

In FIG. 10A and FIG. 10B, an X stimulus value is described as an example. However, red, green, and blue Y stimulus values, that is, the second, fifth, and eight stimulus values YR, YG, and YB may be compensated by the second, fifth, and eight compensation values CV2, CV5, and CV8, respectively. In addition, red, green, and blue Z stimulus values, that is, the third, sixth, and ninth stimulus values ZR, ZG, and ZB may be compensated by the third, sixth, and ninth compensation values CV3, CV6, and CV9, respectively. Thereby, the compensated tristimulus values X'Y'Z' of the red, green, and blue components are generated to effectively prevent distortion at the low gray scale region due to light leakage. Referring back to FIG. 2, the operator 140 generates a first compensation look-up table using the first to third compensated stimulus values XRout, YRout, and ZRout, a second compensation look-up table using the fourth to sixth compensated stimulus values XGout, YGout, and ZGout, and a third compensation look-up table using the seventh to ninth compensated stimulus values XBout, YBout, and ZBout. Here, each of the compensation look-up tables refers to a table mapping stimulus values of corresponding color at each gray scale to corresponding compensated stimulus values as shown in FIGS. 7 to 9. The generated first to third compensation look-up tables may be stored in a second memory 160. In FIG. 2, a structure in which the first and second memories 120 and 160 are separated from each other is illustrated, but the invention is not limited thereto. The color compensation device 180 is shown, but the invention is not limited thereof. In another exemplary embodiment, the color compensation device 180 may include one memory in which the first and second memories 120 and 160 are integrated. In an exemplary embodiment, the operator 140 converts the tristimulus values XYZ into the compensated tristimulus values X'Y'Z' using the compensation look-up tables.

The second color converter 150 may convert the compensated tristimulus values X'Y'Z' into a compensated image signal R'G'B' using the first to third compensation look-up tables store in the second memory 160. In another exemplary embodiment, the second color converter 150 may convert the compensated tristimulus values X'Y'Z' into a compensated image signal R'G'B' using the conversion look-up tables R-LUT2, G-LUT2, B-LUT2, and W-LUT2. The compensated image signal R'G'B' is provided to the display device 200 to be displayed as an image.

Figure 11:
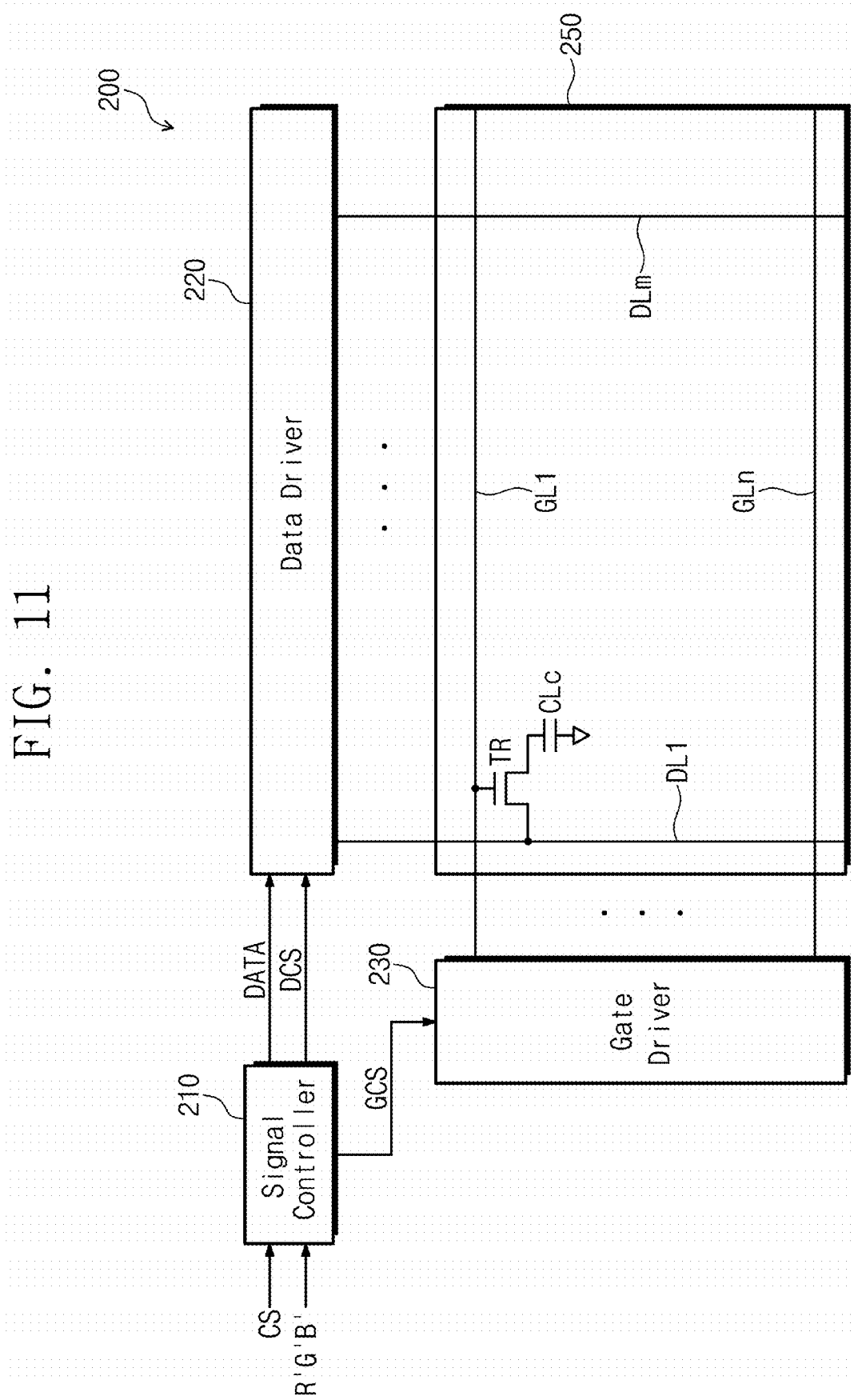
FIG. 11 is a block diagram showing an exemplary embodiment of the configuration of the display device shown in FIG. 1.

FIG. 11 is a block diagram showing an exemplary embodiment of the configuration of the display device shown in FIG. 1.

Referring to FIG. 1 and FIG. 11, the display device 200 includes a display panel 250, a signal controller 210, a data driver 220, and a gate driver 230.

The display panel 250 may be the display panel DP (shown in FIG. 5) including multiple data lines DL1 to DLm, multiple gate lines GL1 to GLn, and multiple pixels.

The multiple data lines DL1 to DLm are extended in one direction, and the multiple gate lines GL1 to GLn are extended in a direction intersecting with the one direction. The multiple pixels are connected to the multiple data lines DL1 to DLm and the multiple gate lines GL1 to GLn.

Each of the multiple pixels is defined as a unit which displays image information and may include a thin film transistor TR and a liquid crystal capacitor CLc connected to the thin film transistor. The each of the multiple pixels may further include a storage capacitor (not shown) connected in parallel to the liquid crystal capacitor CLc.

The signal controller 210 receives the compensated image signal R'G'B' and an image control signal CS either from the graphics controller 100 or the processor 10. Here, for convenience of explanation, a structure in which the compensated image signal R'G'B' outputted from the color compensation device 180 (shown in FIG. 2) is provided to the signal controller 210 is shown, but the invention is not limited thereto. In another exemplary embodiment, the signal controller 210 does not directly receive the compensated image signal R'G'B' and may receive a signal that has been subjected to another additional compensation process through another compensation device before being inputted to the signal controller 210 from the graphics controller 100.

The signal controller 210 generates a gate control signal GCS and a data control signal DCS in response to the image control CS and changes the format of the compensated image signal R'G'B' to generate converted image data DATA. The data driver 220 receives the image data DATA and the data control signal DCS from the signal controller 210 and converts the image data DATA into a data signal to be outputted to the display panel 250 in response to the data control signal DCS. The gate driver 230 receives the gate control signal GCS from the signal controller 210 and generates a gate signal to be outputted to the display panel 250 in response to the gate control signal GCS.

The multiple data lines DL1 to DLm of the display panel 250 receive the data signals from the data driver 220, and the multiple gate lines GL1 to GLn are connected to the gate driver 230 to receive the gate signals. The each of the pixels provided in the display panel 250 is connected to a corresponding gate line among the multiple gate lines GL1 to GLn and to a corresponding data line among the DL1 to DLm. As a result, the each of the multiple pixels may display an image through the gate and data signals.

Here, each of the pixels may include three sub-pixels (not shown) disposed corresponding to the red, green and blue color filters R, G, and B, respectively. Each of the sub-pixels according to the inventive concept receives a data signal based on the compensated image signal R'G'B' which has been compensated through the color compensation device 180. As described above, the color compensation device 180 calculates, through the calculation process according to FIGS. 6 to 9, the compensated tristimulus values X'Y'Z' in consideration of the color leakage components ΔR, ΔG, and ΔB and outputs the compensated image signal R'G'B' converted therefrom.

Therefore, in the case that the three sub-pixels express the black gray scale, even though a light leakage phenomenon substantially occurs in each of the sub-pixels, by displaying an image using the compensated image signal R'G'B' reflecting a light leakage component for each color, the display quality of the display device 200 may be improved.

Figure 12B:
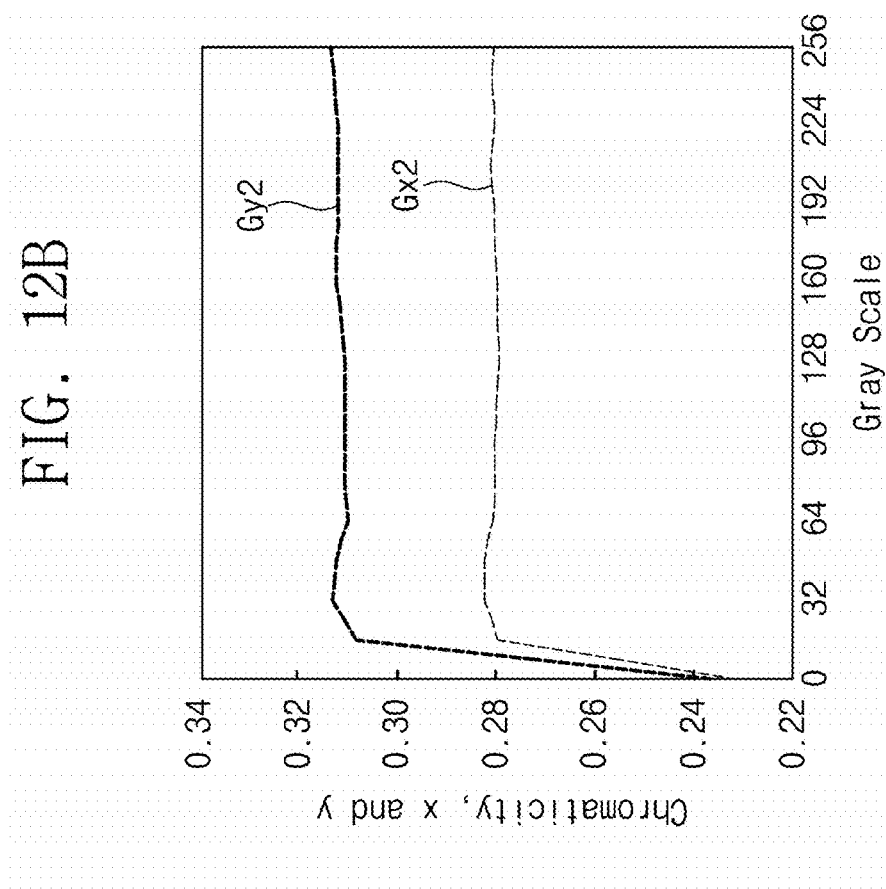
FIG. 12B is a graph of chromaticity versus gray scale showing color coordinates in a display device according to the inventive concept.
Figure 12A:
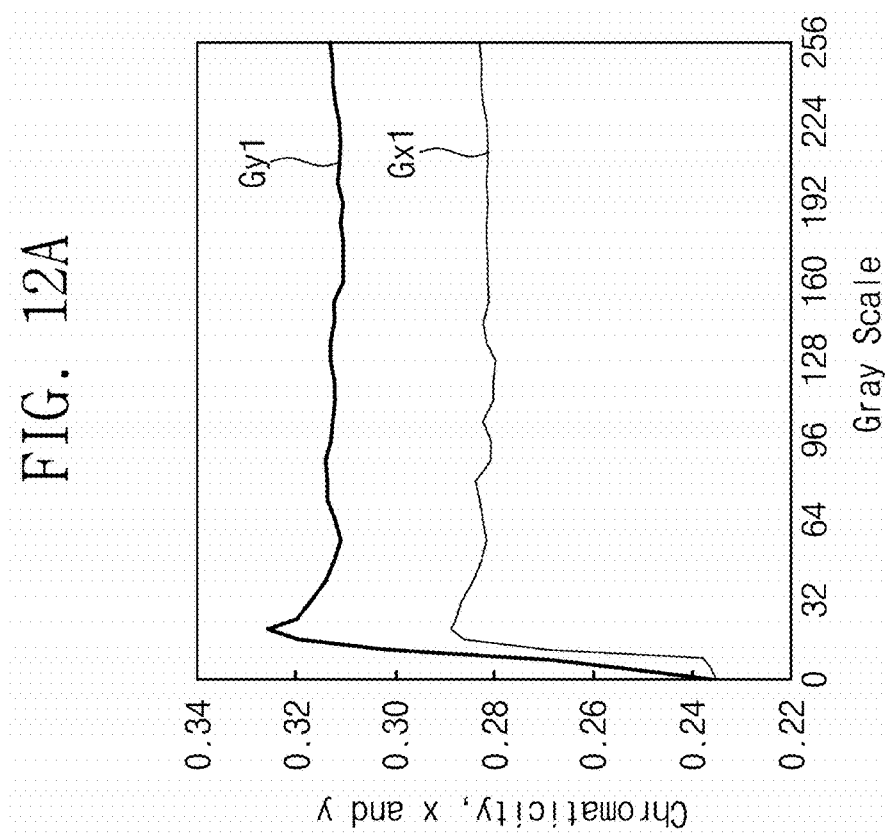
FIG. 12A is a graph of chromaticity versus gray scale showing color coordinates in a typical display device.

FIG. 12A is a graph of chromaticity versus gray scale showing color coordinates in a typical display device, and FIG. 12B is a graph of chromaticity versus gray scale showing color coordinates in a display device according to the inventive concept.

In FIG. 12A, a first graph Gy1 represents y color coordinates of a typical display device and a second graph Gx1 represents x color coordinates of the same. In FIG. 12B, a third graph Gy2 represents y color coordinates of a display device according to the inventive concept, and a fourth graph Gx2 represents x color coordinates of the same.

According to FIG. 12A, the typical display device performs color compensation without considering a light leakage phenomenon at low gray scales, such that the y color coordinates and the x color coordinates become high at the low gray scales, which causes color distortion. However, as shown in FIG. 12B, according to the inventive concept, an image is displayed based on the compensated image signal R'G'B' in consideration of the light leakage phenomenon, especially, at the low gray scales. Therefore, different from the typical display device, the y color coordinates and the x color coordinates do not become so high at the low gray scales but are maintained, which prevents the color distortion. That is, the deterioration of image quality due to color distortion at a low gray scale region may be effectively prevented, so that the overall display quality of the display device 200 may be improved.

Referring to FIGS. 1 to 12B, exemplary embodiments in which the color compensation device 180 is embedded in the graphics controller 100 are shown, but the inventive concept is not limited thereto. In another exemplary embodiment, the color compensation device 180 may be provided in the display device 200.

Hereinafter, an exemplary embodiment in which the color compensation device 180 has been added to the display device 200 as one functional block will be described.

Figure 13:
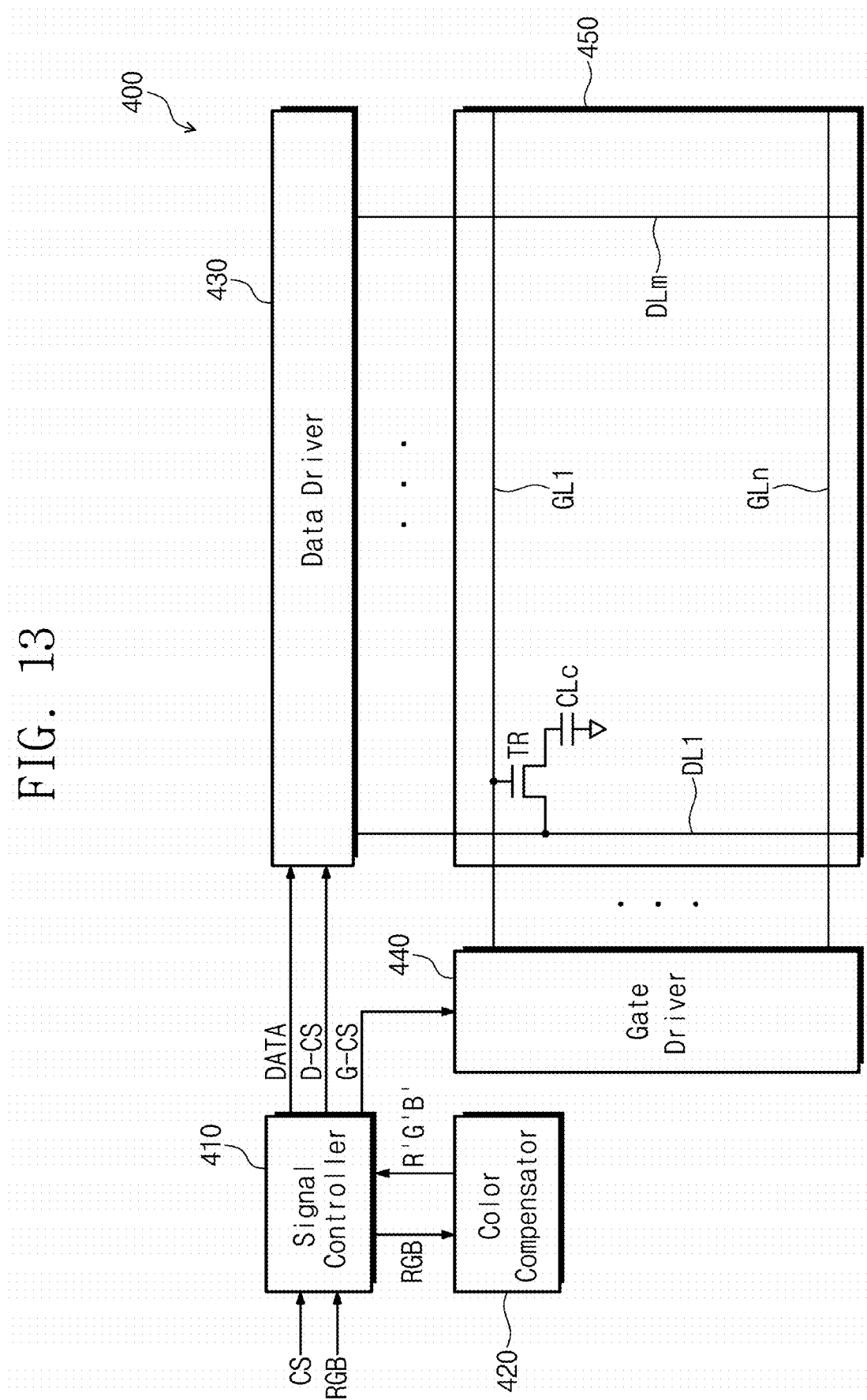
FIG. 13 is a block diagram of another exemplary embodiment of a display device according to the inventive concept.

FIG. 13 is a block diagram of another exemplary embodiment of a display device according to the inventive concept.

For convenience of explanation, differences from the exemplary embodiments previously described will be mainly described, and for omitted parts, the explanations regarding the exemplary embodiments previously described may be applied. In addition, redundant descriptions of the elements described above are omitted.

Referring to FIG. 13, a display device 400 according to another exemplary embodiment of the inventive concept includes a display panel 450, a signal controller 410, a color compensator 420, a data driver 430, and a gate driver 440.

The color compensator 420 may compensate the image signal RGB inputted into the display device 400. The signal controller 410 receives the image signal RGB from a graphics controller or a processor and may send the image signal RGB to the color compensator 420 for compensation before processing the received image signal RGB. Here, since a compensation process performed in the color compensator 420 is the same as the compensation process shown in FIGS. 2 to 9, a detailed description thereof will be omitted.

The color compensator 420 generates the compensated image signal R'G'B' through the compensation process and transmits the generated compensated image signal R'G'B' back to the signal controller 410. The signal controller 410 process the compensated image signal R'G'B' to generate the image data DATA and transmits the generated image data DATA to the data driver 430.

In FIG. 13, the color compensator 420 is shown as a separate block from the signal controller 410. However, in another exemplary embodiment, the color compensator 420 may be provided in the signal controller 410 to perform a color compensation function. That is, the color compensator 420 and the signal controller 410 may be provided in separate chips, or may be provided in the same single chip according to the another exemplary embodiment of the inventive concept.

As such, through the color compensator 420, the display device 400 may display an image using the compensated image signal R'G'B' reflecting a light leakage component for each color. As a result, a color distortion phenomenon at a low gray scale may be compensated, and the overall display quality of the display device 400 may be improved.

A color compensation device, an electronic device including the same, and a color compensation method of an electronic device according to an exemplary embodiment of the inventive concept, a color distortion phenomenon at low gray scales due to a light leakage phenomenon may be prevented and accurate color compensation may be obtained, such that the display quality of a display device may be improved.

It will be understood by those skilled in the art that various changes in form and details may be made therein without departing from the spirit and scope of the inventive concept as defined in the appended claims. In addition, the exemplary embodiments disclosed in the invention are not intended to limit the technical spirit of the invention, and all technical ideas within the scope of the following claims and equivalents thereof should be construed as falling within the scope of the invention.

What is claimed is:

1. A color compensation device comprising:
    a first color converter which receives an image signal, converts the image signal into initial tristimulus values based on a basic look-up table, and generates a conversion look-up table using the basic look-up table;
    a parameter generator which extracts 2N number of representative parameters from the conversion look-up table and generates N number of compensation parameters on the basis of the 2N number of representative parameters, N being a natural number;
    an operator which generates compensated tristimulus values at each gray scale based on the N number of compensation parameters, generates a compensation look-up table, and converts the initial tristimulus values into the compensated tristimulus values using the compensation look-up table; and a second color converter which converts the compensated tristimulus values into a compensated image signal.

2. The color compensation device of claim 1, wherein the 2N number of representative parameters comprise N number of first tristimulus values having a first representative gray scale and N number of second tristimulus values having a second representative gray scale.

3. The color compensation device of claim 2, wherein the first representative gray scale is a black gray scale and the second representative gray scale is a white gray scale.

4. The color compensation device of claim 2, wherein the N number of first tristimulus values comprise:
a first red X stimulus value, a first red Y stimulus value, and a first red Z stimulus value with respect to a red component at the first representative gray scale;
a first green X stimulus value, a first green Y stimulus value, and a first green Z stimulus value with respect to a green component at the first representative gray scale; and
a first blue X stimulus value, a first blue Y stimulus value, and a first blue Z stimulus value with respect to a blue component at the first representative gray scale, and
wherein the N number of second tristimulus values comprise:
a second red X stimulus value, a second red Y stimulus value, and a second red Z stimulus value with respect to the red component at the second representative gray scale;
a second green X stimulus value, a second green Y stimulus value, and a second green Z stimulus value with respect to the green component at the second representative gray scale; and
a second blue X stimulus value, a second blue Y stimulus value, and a second blue Z stimulus value with respect to the blue component at the second representative gray scale.

5. The color compensation device of claim 4, wherein the N number of compensation parameters comprise:
first to third compensation parameters, with respect to the red component which, are generated by subtracting the first red X stimulus value, the first red Y stimulus value, and the first red Z stimulus value from the second red X stimulus value, the second red Y stimulus value, and the second red Z stimulus value, respectively;
fourth to sixth compensation parameters, with respect to the green component, which are generated by subtracting the first green X stimulus value, the first green Y stimulus value, and the first green Z stimulus value from the second green X stimulus value, the second green Y stimulus value, and the second green Z stimulus value, respectively; and
seventh to ninth compensation parameters, with respect to the blue component, which are generated by subtracting the first blue X stimulus value, the first blue Y stimulus value, and the first blue Z stimulus value from the second blue X stimulus value, the second blue Y stimulus value, and the second blue Z stimulus value, respectively.

6. The color compensation device of claim 5, wherein the compensated tristimulus values at each gray scale comprise:
first to third compensated stimulus values with respect to the red component at the gray scale;
fourth to sixth compensated stimulus values with respect to the green component at the gray scale; and
seventh to ninth compensated stimulus values with respect to the blue component at the gray scale.

7. The color compensation device of claim 6, wherein
the first to third compensated stimulus values are values generated by multiplying first to third compensation values by first to third white stimulus values with respect to a white component at the gray scale, respectively;
the fourth to sixth compensated stimulus values are values generated by multiplying fourth to sixth compensation values by the first to third white stimulus values at the gray scale, respectively; and
the seventh to ninth compensated stimulus values are values generated by multiplying seventh to ninth compensation values by the first to third white stimulus values at the gray scale, respectively.

8. The color compensation device of claim 7, wherein
the first compensation value is a ratio of the first compensation parameter to the sum of the first, fourth and seventh compensation parameters;
the second compensation value is a ratio of the second compensation parameter to the sum of the second, fifth and eighth compensation parameters; and
the third compensation value is a ratio of the third compensation parameter to the sum of the third, sixth and ninth compensation parameters.

9. The color compensation device of claim 7, wherein
the fourth compensation value is a ratio of the fourth compensation parameter to the sum of the first, fourth and seventh compensation parameters;
the fifth compensation value is a ratio of the fifth compensation parameter to the sum of the second, fifth and eighth compensation parameters; and
the sixth compensation value is a ratio of the sixth compensation parameter to the sum of the third, sixth and ninth compensation parameters.

10. The color compensation device of claim 7, wherein
the seventh compensation value is a ratio of the seventh compensation parameter to the sum of the first, fourth and seventh compensation parameters;
the eighth compensation value is a ratio of the eighth compensation parameter to the sum of the second, fifth and eighth compensation parameters; and
the ninth compensation value is a ratio of the ninth compensation parameter to the sum of the third, sixth and ninth compensation parameters.

11. An electronic device comprising:
a processor;
a graphics controller; and
a display device,
wherein one of the graphics controller and the display device comprises a color compensation device, and the color compensation device includes:
a first color converter which receives an image signal, converts the image signal into initial tristimulus values based on a basic look-up table, and generates a conversion look-up table using the basic look-up table;
a parameter generator which extracts 2N number of representative parameters from the conversion look-up table and generates N number of compensation parameters on the basis of the 2N number of representative parameters, N being a natural number;
an operator which generates compensated tristimulus values at each gray scale based on the N number of compensation parameters, generates a compensation look-up table, and converts the initial tristimulus values into the compensated tristimulus values using the compensation look-up table; and
a second color converter which converts the compensated tristimulus values into a compensated image signal.

12. The electronic device of claim 11, wherein the color compensation device is provided in the graphics controller.

13. The electronic device of claim 12, wherein the display device further comprises a signal controller which receives the compensated image signal and converts the compensated image signal into image data.

14. The electronic device of claim 11, wherein the color compensation device is provided in the display device.

15. A color compensation method of an electronic device, comprising:
   receiving an image signal;
   converting the image signal into initial tristimulus values based on a basic look-up table and generating a conversion look-up table using the basic look-up table;
   extracting 2N number of representative parameters from the conversion look-up table, N being a natural number;
   generating N number of compensation parameters on the basis of the 2N number of representative parameters;
   generating compensated tristimulus values at each gray scale based on the N number of compensation parameters;
   generating a compensation look-up table and converting the initial tristimulus values into the compensated tristimulus values using the compensation look-up table; and
   converting the compensated tristimulus values into a compensated image signal.

16. The method of claim 15, wherein the 2N number of representative parameters comprise N number of first tristimulus values having a first representative gray scale and N number of second tristimulus values having a second representative gray scale.

17. The method of claim 16, wherein the first representative gray scale is a black gray scale and the second representative gray scale is a white gray scale.

18. The method of claim 17, wherein
   the N number of first tristimulus values comprise:
   a first red X stimulus value, a first red Y stimulus value, and a first red Z stimulus value with respect to a red component at the first representative gray scale;
   a first green X stimulus value, a first green Y stimulus value, and a first green Z stimulus value with respect to a green component at the first representative gray scale; and
   a first blue X stimulus value, a first blue Y stimulus value, and a first blue Z stimulus value with respect to a blue component at the first representative gray scale, and wherein the N number of second tristimulus values comprise:
   a second red X stimulus value, a second red Y stimulus value, and a second red Z stimulus value with respect to the red component at the second representative gray scale;
   a second green X stimulus value, a second green Y stimulus value, and a second green Z stimulus value with respect to the green component at the second representative gray scale; and
   a second blue X stimulus value, a second blue Y stimulus value, and a second blue Z stimulus value with respect to the blue component at the second representative gray scale.

19. The method of claim 18, wherein the N number of compensation parameters comprise:
   first to third compensation parameters, with respect to the red component, which are generated by subtracting the first red X stimulus value, the first red Y stimulus value, and the first red Z stimulus value from the second red X stimulus value, the second red Y stimulus value, and the second red Z stimulus value, respectively;
   fourth to sixth compensation parameters, with respect to the green component, which are generated by subtracting the first green X stimulus value, the first green Y stimulus value, and the first green Z stimulus value from the second green X stimulus value, the second green Y stimulus value, and the second green Z stimulus value, respectively; and
   seventh to ninth compensation parameters, with respect to the blue component, which are generated by subtracting the first blue X stimulus value, the first blue Y stimulus value, and the first blue Z stimulus value from the second blue X stimulus value, the second blue Y stimulus value, and the second blue Z stimulus value, respectively.

20. The method of claim 19, wherein the compensated tristimulus values at each gray scale comprise:
   first to third compensated stimulus values with respect to the red component at the gray scale;
   fourth to sixth compensated stimulus values with respect to the green component at the gray scale; and
   seventh to ninth compensated stimulus values with respect to the blue component at the gray scale.

* * * * *

UNITED STATES PATENT AND TRADEMARK OFFICE
CERTIFICATE OF CORRECTION

PATENT NO.          : 10,796,663 B2                     Page 1 of 1
APPLICATION NO.     : 16/527469
DATED               : October 6, 2020
INVENTOR(S)         : Jongman Kim et al.

It is certified that error appears in the above-identified patent and that said Letters Patent is hereby corrected as shown below:

In the Specification

Delete "the first conversion look-up table G-LUT2" represented in Column 9, Line 26 and insert --the second conversion look-up table G-LUT2.-- and delete "XG0, YG0, ZG0, XG255, YG255, and ZG255 from the first conversion look-up table B-LUT2." represented in Column 9, Line 37 and insert --XB0, YB0, ZB0, XB255, YB255, and ZB255 from the third conversion look-up table B-LUT2.--

Signed and Sealed this
Twenty-second Day of December, 2020

Andrei Iancu
*Director of the United States Patent and Trademark Office*